US009299362B2

(12) United States Patent
Kimura et al.

(10) Patent No.: US 9,299,362 B2
(45) Date of Patent: Mar. 29, 2016

(54) AUDIO SIGNAL PROCESSING DEVICE

(75) Inventors: Masaru Kimura, Tokyo (JP); Bunkei Matsuoka, Tokyo (JP); Takashi Yamazaki, Tokyo (JP); Asako Omote, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1026 days.

(21) Appl. No.: 13/257,004

(22) PCT Filed: May 17, 2010

(86) PCT No.: PCT/JP2010/003308
§ 371 (c)(1),
(2), (4) Date: Sep. 16, 2011

(87) PCT Pub. No.: WO2011/001589
PCT Pub. Date: Jan. 6, 2011

(65) Prior Publication Data
US 2012/0010738 A1 Jan. 12, 2012

(30) Foreign Application Priority Data
Jun. 29, 2009 (JP) ................................ 2009-153839

(51) Int. Cl.
*G06F 17/00* (2006.01)
*G10L 21/038* (2013.01)
(Continued)

(52) U.S. Cl.
CPC ............ *G10L 21/038* (2013.01); *G10H 1/0091* (2013.01); *G10H 2210/066* (2013.01); *G10H 2210/321* (2013.01); *G10H 2240/061* (2013.01); *G10L 25/90* (2013.01)

(58) Field of Classification Search
CPC .... G10L 21/038; G10L 25/90; G10H 1/0091; G10H 2210/066; G10H 2210/321; G10H 2240/061
USPC ........................................................... 700/94
See application file for complete search history.

(56) References Cited

U.S. PATENT DOCUMENTS 3,569,626 A * 3/1971 Michishita et al. ........... 375/329
4,044,204 A * 8/1977 Wolnowsky et al. ......... 704/208
(Continued)

FOREIGN PATENT DOCUMENTS

CN 101267223 A 9/2008
CN 101405791 A 4/2009
(Continued)

OTHER PUBLICATIONS download of 2008049590 from patentscope.wipo.int.*
(Continued)

*Primary Examiner* — Paul McCord
(74) *Attorney, Agent, or Firm* — Oblon, McClelland, Maier & Neustadt, L.L.P.

(57) ABSTRACT

An audio signal processing device 100 includes a period detecting unit 102 for detecting the fundamental period of an input audio signal 101; a square wave generating unit 106 for generating, according to the fundamental period the period detecting unit 102 detects, a square wave 107 whose period is an integer multiple of the fundamental period; an amplitude correction coefficient generating unit 103 for calculating an amplitude correction coefficient 109 approximately equal and proportional to the intensity of the input audio signal 101; a first multiplier 108 for generating an amplitude-corrected square wave 110 by multiplying the square wave 107 by the amplitude correction coefficient 109; and an adder 104 for adding the amplitude-corrected square wave 110 to the input audio signal 101.

10 Claims, 6 Drawing Sheets

(51) Int. Cl.

| | |
|---|---|
| ***G10H 1/00*** | (2006.01) |
| *G10L 25/90* | (2013.01) |

(56) References Cited

U.S. PATENT DOCUMENTS

| | | | | |
|---|---|---|---|---|
| 4,185,529 | A * | 1/1980 | Kitagawa | 84/622 |
| 4,291,603 | A * | 9/1981 | Katz | 84/603 |
| 4,776,014 | A * | 10/1988 | Zinser, Jr. | 704/262 |
| 4,797,926 | A * | 1/1989 | Bronson et al. | 704/214 |
| 5,024,134 | A * | 6/1991 | Uchiyama | 84/654 |
| 5,220,201 | A * | 6/1993 | Kawasaki et al. | 327/156 |
| 5,524,172 | A * | 6/1996 | Hamon | 704/268 |
| 5,758,020 | A * | 5/1998 | Tsutsui | 704/204 |
| 5,824,936 | A * | 10/1998 | DuPuis et al. | 84/663 |
| 5,930,373 | A * | 7/1999 | Shashoua et al. | 381/98 |
| 5,998,725 | A * | 12/1999 | Ohta | 84/627 |
| 6,096,960 | A * | 8/2000 | Scott | 84/603 |
| 6,111,960 | A * | 8/2000 | Aarts et al. | 381/61 |
| 6,266,644 | B1 * | 7/2001 | Levine | 704/503 |
| 6,285,767 | B1 * | 9/2001 | Klayman | 381/17 |
| 6,865,430 | B1 * | 3/2005 | Runton et al. | 700/94 |
| 7,016,509 | B1 * | 3/2006 | Bharitkar et al. | 381/98 |
| 7,194,093 | B1 * | 3/2007 | Thiede | 381/58 |
| 7,412,220 | B2 * | 8/2008 | Beyer | 455/222 |
| 7,485,797 | B2 * | 2/2009 | Sumita | 84/613 |
| 7,790,977 | B2 * | 9/2010 | Sato | 84/625 |
| 8,213,636 | B2 * | 7/2012 | De Muynke et al. | 381/98 |
| 8,229,135 | B2 * | 7/2012 | Sun et al. | 381/98 |
| 8,290,180 | B2 * | 10/2012 | Yamada et al. | 381/98 |
| 8,380,331 | B1 * | 2/2013 | Smaragdis et al. | 700/94 |
| 8,416,965 | B2 * | 4/2013 | Hung | 381/98 |
| 8,853,516 | B2 * | 10/2014 | Arimoto et al. | 84/600 |
| 2005/0111562 | A1 | 5/2005 | Koyanagi | |
| 2005/0123153 | A1 * | 6/2005 | Toki | 381/106 |
| 2006/0075884 | A1 * | 4/2006 | Streitenberger et al. | 84/616 |
| 2006/0251261 | A1 * | 11/2006 | Christoph | 381/1 |
| 2007/0021959 | A1 * | 1/2007 | Goto | 704/233 |
| 2008/0273718 | A1 | 11/2008 | Ohkuri et al. | |
| 2009/0216353 | A1 * | 8/2009 | Van Reck | 700/94 |
| 2010/0014576 | A1 * | 1/2010 | Komamura | 375/240 |
| 2010/0023322 | A1 | 1/2010 | Schnell et al. | |
| 2010/0172060 | A1 * | 7/2010 | Woo et al. | 361/56 |
| 2011/0106529 | A1 * | 5/2011 | Disch | 704/205 |

FOREIGN PATENT DOCUMENTS

| | | |
|---|---|---|
| JP | 62 26996 | 2/1987 |
| JP | 11 234788 | 8/1999 |
| JP | 2006 222867 | 8/2006 |
| JP | 2007 178675 | 7/2007 |
| JP | 2008 263583 | 10/2008 |
| WO | 03 096534 | 11/2003 |

OTHER PUBLICATIONS translation of 2006222867 as provided by applicant.*

Electroharmonix POG user manual: Available for sale at least Jun. 2009.*

Electroharmonix Micro_synthesizer user manual: Available for sale at least Jun. 2009.*

MOTM 120 sub octave synthesizer; available for sale at least 2006.*

Office Action issued Aug. 2, 2013 in Chinese Patent Application No. 201080020292.5 with partial English language translation.

U.S. Appl. No. 13/260,049, filed Sep. 23, 2011, Kimura, et al.

International Search Report issued Jun. 29, 2010 in PCT/JP10/003308 filed May 17, 2010.

* cited by examiner (a)

(b)

AUDIO SIGNAL PROCESSING DEVICE

TECHNICAL FIELD

The present invention relates to an audio signal processing device for reproducing a compression-encoded audio signal.

BACKGROUND ART

Recently, techniques have been spread which reduce the capacity of a storage device for storing audio signals or reduce the amount of communications of transmission and reception by carrying out compression encoding such as AAC (Advanced Audio Codec) or MP3 (MPEG Audio Layer 3) rather than by using conventional audio CDs. The compression-encoded audio signal, however, has a tendency to lack impact of a low-range component and to reduce depth of sounds.

Thus, Patent Document 1, for example, proposes an effector for improving a low-range component of a compression-encoded audio signal. FIG. 6 is a block diagram showing a configuration of an effector 10 proposed by the Patent Document 1. The effector 10 uses, as its input, an audio signal obtained by decoding a musical signal with a high compression ratio such as AAC and MP3, and a gain assigning circuit 11 assigns different nonlinear gains to a positive waveform portion and a negative waveform portion of the input audio signal. Next, from a high-range component of the input audio signal to which the nonlinear gain is assigned by the gain assigning circuit 11, a high-range component creating circuit 12 creates an audio signal component with a range higher than the high-range component. Likewise, from a low-range component of the input audio signal to which the nonlinear gain is assigned by the gain assigning circuit 11, the low-range component creating circuit 13 creates an audio signal component with a range lower than the low-range component. Then, an addition combining circuit 14 adds and combines the input audio signal to which the gain is assigned with the high range audio signal component and the low-range audio signal component. Thus, it can improve the sound quality of the input audio signal. In particular, as for the low range, since the low-range component creating circuit 13 generates the low-range component with a frequency lower than the low range of the input audio signal, it can achieve powerful low-range emphasis effect.

PRIOR ART DOCUMENT

Patent Document

Patent Document 1: Japanese Patent Laid-Open No. 2007-178675.

DISCLOSURE OF THE INVENTION

With the foregoing configuration, the conventional audio signal processing device has problems of causing nonlinear distortion over a wide frequency band owing to the nonlinear gain assigned to the input audio signal, and of deforming the sound quality of the components other than the low-range and high-range components to be emphasized.

The present invention is implemented to solve the foregoing problems. Therefore it is an object of the present invention to provide an audio signal processing device capable of achieving powerful and rich low-range emphasis effect by restoring only the low-range component of the audio signal deteriorated by the compression encoding processing.

An audio signal processing device in accordance with the present invention includes: a period detecting unit for detecting a fundamental period of an input audio signal; a signal generating unit for generating, according to the fundamental period the period detecting unit detects, a signal whose period is an integer multiple of the fundamental period; and an adder for adding the signal the signal generating unit generates to the input audio signal.

According to the present invention, since it generates, according to the fundamental period of the input audio signal, the signal whose period is an integer multiple of the fundamental period and adds the signal to the input audio signal, it can restore only the low-range component of the audio signal deteriorated by compression encoding processing, thereby being able to achieve powerful and rich low-range emphasis effect.

BRIEF DESCRIPTION OF THE DRAWINGS

FIG. 4(*a*) shows a window function output value of Condition 1, and FIG. 4(*b*) shows a window function output value of condition 2;

FIG. 5(*a*) shows frequency characteristics of a square wave, and FIG. 5(*b*) shows frequency characteristics of the square wave after window processing using the window function of the Condition 1.

EMBODIMENTS FOR CARRYING OUT THE INVENTION

Embodiment 1

Figure 1:
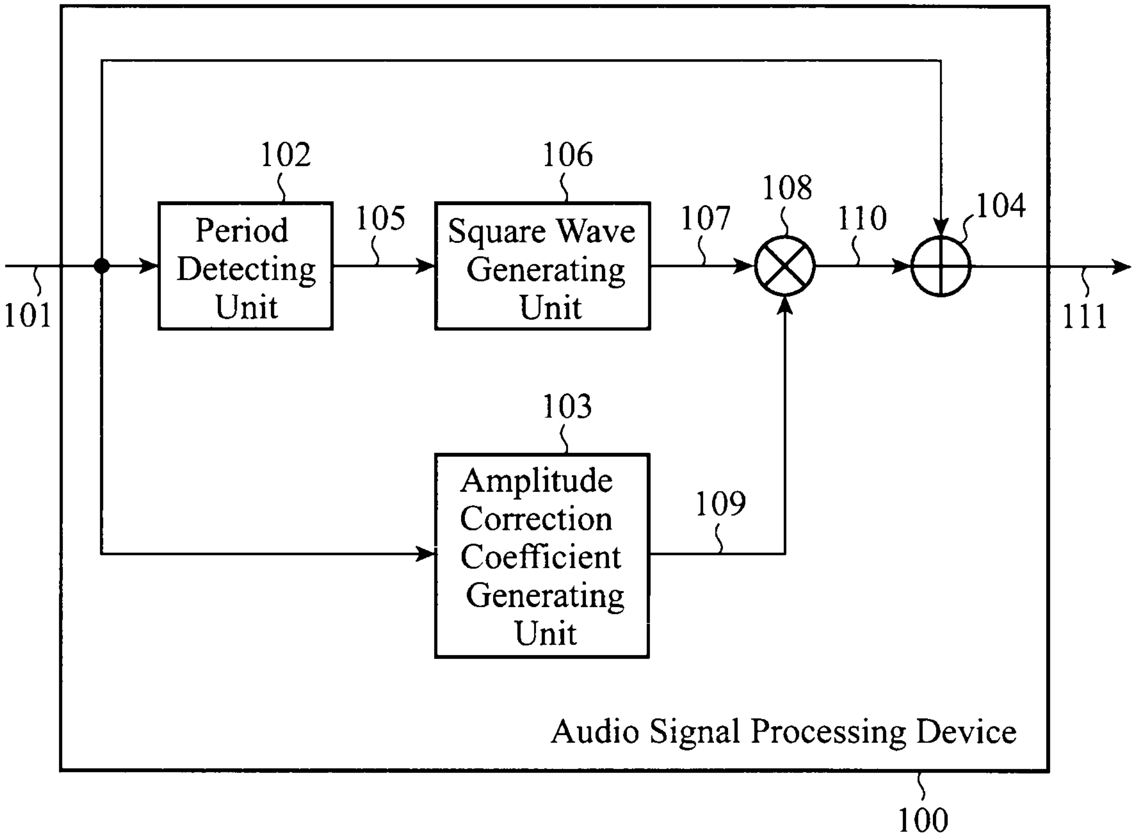
FIG. 1 is a block diagram showing a configuration of an audio signal processing device of an embodiment 1 in accordance with the present invention.

FIG. 1 is a block diagram showing a configuration of an audio signal processing device 100 of an embodiment 1 in accordance with the present invention. The audio signal processing device 100 shown in FIG. 1 comprises a period detecting unit 102 for detecting the fundamental period of an input audio signal 101, a square wave generating unit (signal generating unit) 106 for generating a square wave 107 whose period is twice the fundamental period, an amplitude correction coefficient generating unit 103 for calculating an amplitude correction coefficient 109 for matching the amplitude of the square wave 107 to the amplitude of the input audio signal 101, a first multiplier 108 for correcting the square wave 107 by the amplitude correction coefficient 109, and an adder 104 for adding an amplitude-corrected square wave 110 to the input audio signal 101.

The audio signal processing device 100 shown in FIG. 1 decodes compression-encoded audio data with a decoder not shown and uses as the input audio signal 101. The input audio signal 101 is split in three when input to the audio signal processing device 100 to be supplied to the period detecting unit 102, amplitude correction coefficient generating unit 103 and adder 104, respectively.

The period detecting unit 102 detects the fundamental period of the input audio signal 101. As a detecting method of the fundamental period, techniques known to the public such as a method of calculating an autocorrelation function can be used and detailed description thereof will be omitted. Although the method of calculating the autocorrelation function is known as a detecting method of high accuracy, a method is not limited to it. For example, any given detecting method can be employed such as a method of detecting peak values of the input audio signal 101, a method of detecting zero-crossing points and a method of detecting a local maximum or local minimum of a difference value between previous and succeeding samples.

The period detecting unit 102 generates a signal that enables identification of one period of the fundamental period of the input audio signal 101 from the fundamental period detected. The period detecting unit 102 generates an impulse signal once per period and a zero signal during the remainder of the period. It goes without saying that the other methods can be used. For example, a method is possible which generates a signal that changes its output value to any given value at each period. Any signal the period detecting unit 102 generates to enable identification of one period is generically referred to as a synchronization signal 105 from now on.

The synchronization signal 105 is supplied from the period detecting unit 102 to the square wave generating unit 106.

Figure 2:
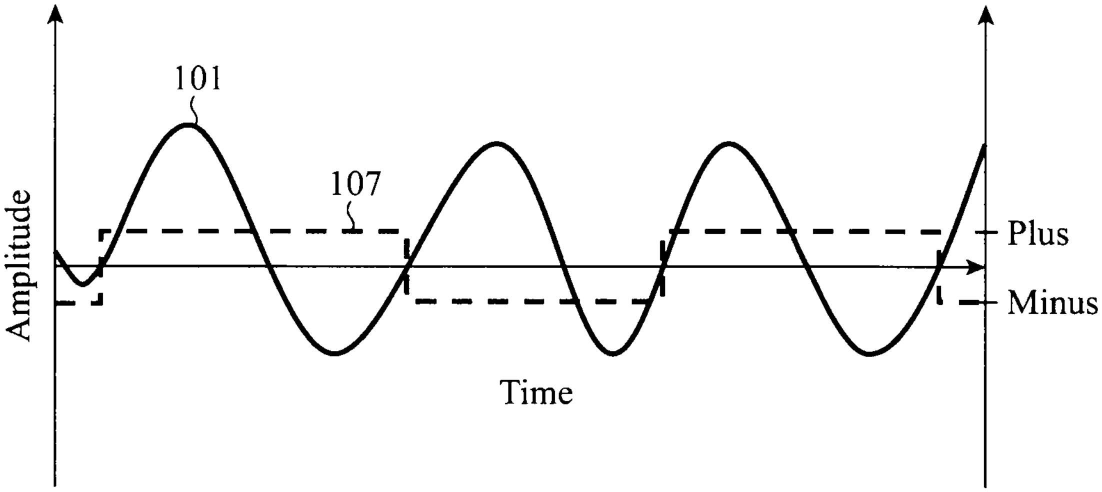
FIG. 2 is a graph showing an example of a square wave the square wave generating unit shown in FIG. 1 generates.

According to the synchronization signal 105 supplied, the square wave generating unit 106 generates the square wave 107 that reverses its sign (plus and minus, for example) at every period. FIG. 2 is a graph showing an example of the square wave 107 the square wave generating unit 106 generates. In FIG. 2, the input audio signal 101 that refers to the amplitude along the left vertical axis is shown by a solid line, and the square wave 107 that refers to the plus and minus along the right vertical axis is shown by a broken line. As shown in FIG. 2, the square wave generating unit 106 generates the square wave 107 whose polarity is reversed at every period of the input audio signal 101. The square wave 107 has a period twice that of the fundamental frequency (low-range component) of the input audio signal 101 and half the frequency thereof.

The square wave 107 is supplied from the square wave generating unit 106 to the first multiplier 108.

An amplitude correcting unit consists of the amplitude correction coefficient generating unit 103 and the first multiplier 108.

The amplitude correction coefficient generating unit 103 calculates the amplitude correction coefficient 109 for making the intensity of the square wave 107 proportional to the intensity of the input audio signal 101. As a calculating method of the amplitude correction coefficient 109, there is a method of estimating the effective value of the input audio signal 101 and multiplying the estimated effective value by a preset proportionality constant $\alpha$. Here, as the proportionality constant $\alpha$, a value not greater than one is used generally.

As the estimation method of the effective value, there is a method of calculating the square root of a short-time mean value of the power of the input audio signal 101, or a method of calculating a short-time mean value of amplitude absolute values of the input audio signal 101. Alternatively, a method is also possible which uses an instantaneous amplitude value of the input audio signal 101 instead of the effective value. However, since the input audio signal 101 usually contains a high-range component and hence fluctuations of the intensity of the instantaneous amplitude value become great, there are some cases where stable effect cannot be obtained because of the great fluctuations of the intensity of the square wave when using the instantaneous amplitude value as it is instead of the effective value. Accordingly, it is desirable in this case for the amplitude correction coefficient generating unit 103 to cut the high-range component of the input audio signal 101 through an LPF (Low-Pass Filter), and to use the instantaneous amplitude value of the signal after that.

The amplitude correction coefficient 109 is supplied from the amplitude correction coefficient generating unit 103 to the first multiplier 108.

The first multiplier 108 corrects the amplitude of the square wave 107 by multiplying the input square wave 107 by the amplitude correction coefficient 109, and supplies the amplitude-corrected square wave 110 passing through the amplitude correction to the adder 104.

The adder 104 adds the input audio signal 101 and the amplitude-corrected square wave 110, and outputs as an output signal 111.

In this way, since the audio signal processing device 100 can generate the amplitude-corrected square wave 110 which is a signal component with a frequency lower than the fundamental frequency of the input audio signal 101, that is, the low-range component, it can assign powerful low-range emphasis effect to the input audio signal 101.

In addition, since it generates the signal component with the frequency lower than the low-range component of the input audio signal 101, the amplitude-corrected square wave 110, and adds it to the original input audio signal 101 to achieve the low-range emphasis effect, it can realize good quality sound without any nonlinear modification of the middle- and high-range component in the original input audio signal 101.

Furthermore, since the amplitude correcting unit corrects the amplitude of the square wave 107 in such a manner as to follow the intensity of the input audio signal 101, it can assign natural low-range emphasis effect that follows the intensity of the input audio signal 101 that changes every moment.

As described above, according to the embodiment 1, the audio signal processing device 100 is configured in such a manner as to comprise the period detecting unit 102 for detecting the fundamental period of the input audio signal 101, the square wave generating unit 106 for generating the square wave 107 whose period is twice the fundamental period the period detecting unit 102 detects, the amplitude correction coefficient generating unit 103 for calculating the amplitude correction coefficient 109 approximately equal and proportional to the intensity of the input audio signal 101, the first multiplier 108 for generating the amplitude-corrected square wave 110 by multiplying the square wave 107 by the amplitude correction coefficient 109, and the adder 104 for adding the amplitude-corrected square wave 110 to the input audio signal 101. Accordingly, it can restore only the low-range component of the input audio signal 101 deteriorated by the compression encoding processing, thereby being able to offer the audio signal processing device 100 capable of realizing the powerful and rich low-range emphasis effect.

In addition, according to the embodiment 1, the amplitude correction coefficient generating unit 103 is configured in such a manner as to produce as the amplitude correction coefficient 109 the value proportional to the estimated value of the effective value of the input audio signal 101 or the value proportional to the instantaneous amplitude value of the input audio signal 101. Accordingly, it can achieve natural low-range emphasis effect following the intensity of the input audio signal 101 that varies with the passage of time.

Incidentally, in the foregoing embodiment 1, there are some cases in which the amplitude correction coefficient 109 varies over time regardless of whether the amplitude correction coefficient generating unit 103 calculates the amplitude correction coefficient 109 by either of the calculating methods. Since the amplitude correction coefficient 109 that varies over time has a frequency component, when the first multiplier 108 corrects the amplitude of the square wave 107 using the amplitude correction coefficient 109, this becomes equivalent to carrying out the same processing as amplitude modulation. Here, since the square wave 107 contains harmonic components odd multiples of the frequency, there are some cases where cross modulation occurring at the amplitude modulation can generate a signal with a spurious frequency component. Thus, to prevent the generation of such a spurious frequency component, it is desirable to provide an LPF before the first multiplier 108 to remove the harmonic components from the square wave 107.

Furthermore, although the foregoing embodiment 1 is configured in such a manner that the square wave generating unit 106 inverts the sign at each period of the input audio signal 101 to generate the square wave 107 whose period is twice the fundamental period, this is not essential. A configuration is also possible which inverts the sign at each N periods (where N is an integer) to generate a square, wave whose period is an integer multiple of the fundamental period. Alternatively, a configuration is also possible in which the square wave generating unit 106 generates a signal whose period is an integer multiple of the fundamental period of the input audio signal 101 instead of the square wave. These configurations can also generate a signal component with a frequency lower than the fundamental frequency of the input audio signal 101, that is, lower than the low-range component, thereby being able to assign the powerful low-range emphasis effect.

Embodiment 2

Figure 3:
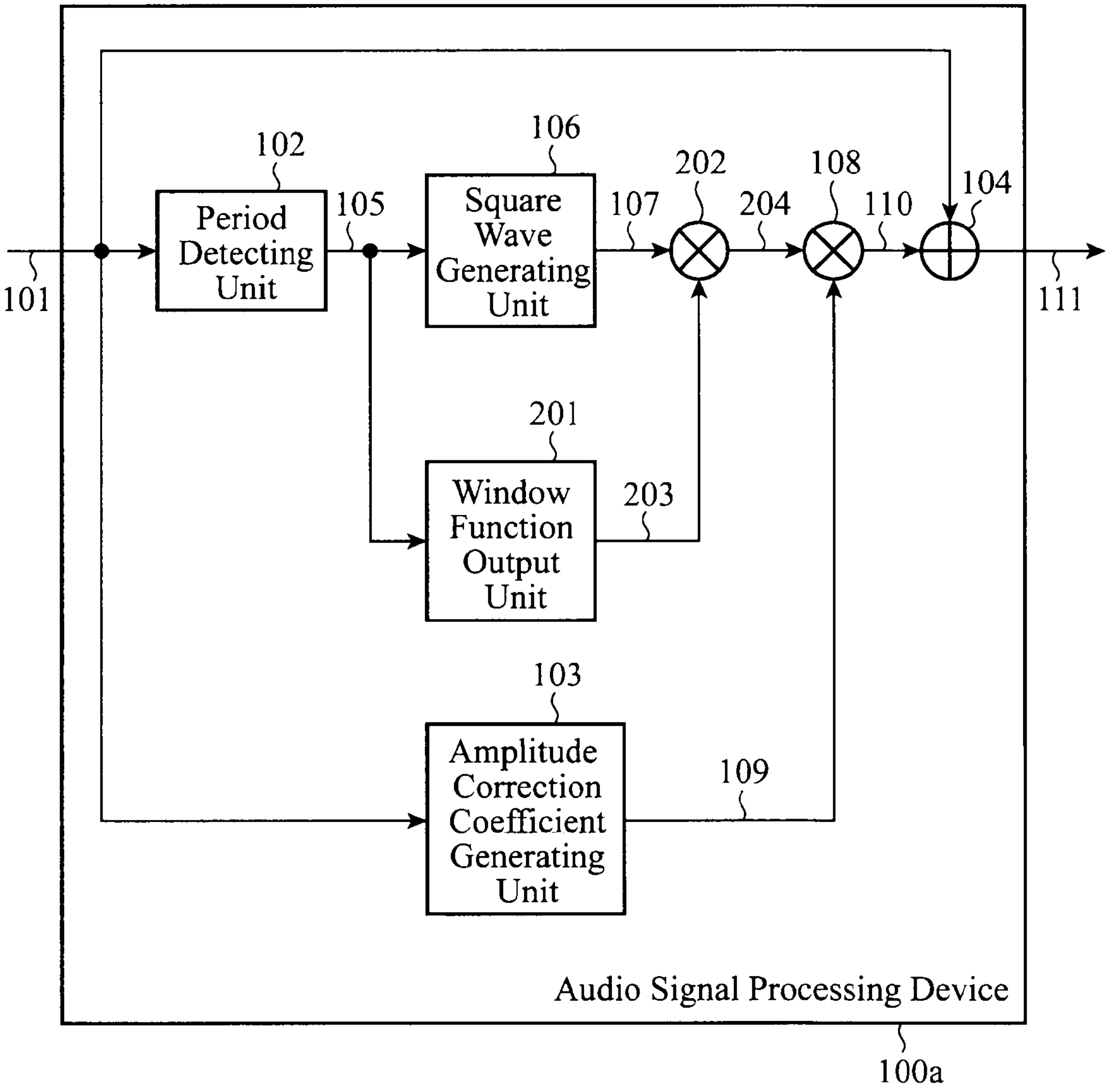
FIG. 3 is a block diagram showing a configuration of an audio signal processing device of an embodiment 2 in accordance with the present invention.

FIG. 3 is a block diagram showing a configuration of an audio signal processing device 100*a* of the embodiment 2. In FIG. 3, the same or like portions to those of FIG. 1 are designated by the same reference numerals, and their description will be omitted. The audio signal processing device 100*a* has a window function output unit 201 and a second multiplier 202 anew.

The window function output unit 201 specifies the period of the input audio signal 101 using the synchronization signal 105 the period detecting unit 102 generates, and outputs a value of a window function initialized once at every N periods, that is, a window function output value 203. Here, it is assumed that N is the same value as the value the square wave generating unit 106 uses. For example, when the square wave generating unit 106 generates the square wave 107 that inverts the input audio signal 101 at every one (=N) period, the window function output unit 201 also initializes the window function at everyone (=N) period of the input audio signal 101.

The second multiplier 202 carries out window processing by multiplying the input square wave 107 by the window function output value 203, and supplies a window-processed square wave 204 passing through the window processing to the first multiplier 108.

Here, details of the window processing carried out by the window function output unit 201 and second multiplier 202 will be described.

As for the window function the window function output unit 201 uses, it is assumed to be one of the publicly known window function such as a triangular window, square window, Hamming window, Hanning window, Kaiser window and Blackman window, and to conform to one of the following two conditions.

Condition 1: It outputs a finite value throughout a preset section (sampling time) from the time of initialization, and outputs zero thereafter.

Condition 2: It outputs a preset initial value at the time of initialization, and outputs a value reducing monotonically thereafter.

Figure 4:
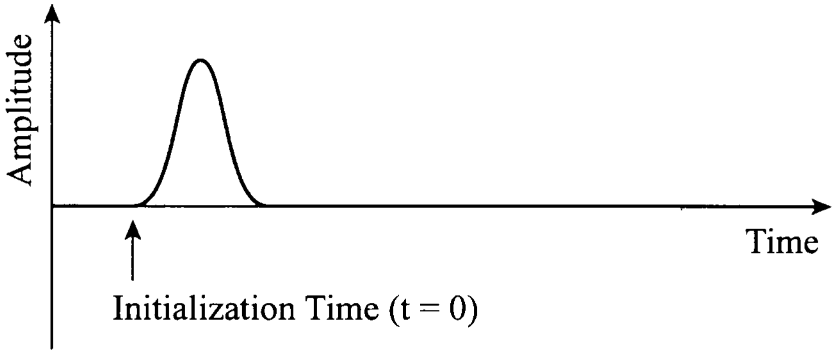
FIG. 4 is a graph showing an example of a window function output value the window function output unit shown in FIG. 3 outputs.
Figure 4:
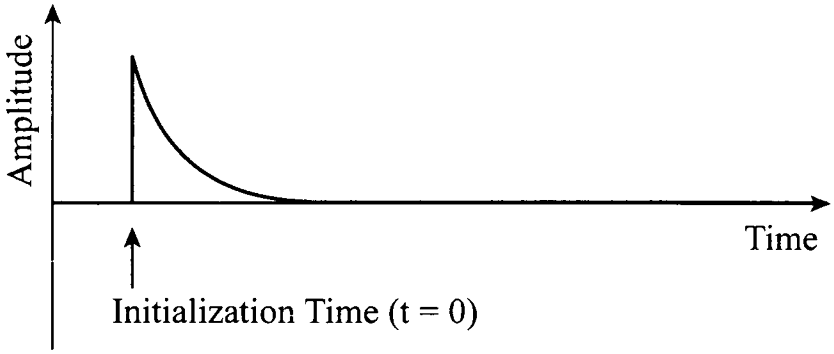

Although any fixed-length window can be used as the window function of Condition 1, it is preferable to use one that varies the window function output value 203 smoothly. Accordingly, a Kaiser window with a window length L is used, for example. FIG. 4(*a*) is a graph showing an example of the window function output value 203 of Condition 1 the window function output unit 201 outputs. It shows a time waveform of the window function output value 203 when using a Kaiser window with a window length L=147 and a parameter β=8 that determines its steepness shape. Incidentally, the window length L can be an arbitrary value. In this example, the window length L=147 is the length corresponding to the period of 300 Hz when the sampling frequency is 44.1 kHz.

As for the window function of Condition 2, it can be realized by setting its initial value at S, and by successively multiplying the preceding window function output value 203 by a coefficient γ less than one, for example. More specifically, the window is generated according to the following expression (1), where W(t) is the window function output value 203 and t is the offset time from the initialization. FIG. 4(*b*) is a graph showing an example of the window function output value 203 of Condition 2 the window function output unit 201 outputs. It shows a time waveform of the window function output value 203 when the initial value S=1 and the coefficient γ=0.98.

$$W(t) = S\gamma^t = \begin{cases} S, & t = 0 \\ W(t-1)\gamma, & t > 0 \end{cases} \tag{1}$$

In FIGS. 4(*a*) and 4(*b*), the time at the initialization (t=0) is indicated by an arrow. It can be observed and confirmed from these figures that both when using the window function of Condition 1 and when using the window function of Condition 2, although a comparatively large value is output immediately after the time of initialization, nearly zero is output from a particular time.

When the second multiplier 202 multiplies the square wave 107 by the window function output value 203 as shown in FIG. 4, the power of the window-processed square wave 204 after the multiplication becomes smaller as the frequency of the square wave 107 becomes lower. This is because the ratio of the initialization in a fixed time reduces as the frequency of the square wave 107 is lower, and hence a section in which the value of the window-processed square wave 204 is zero becomes relatively long. In addition, a section in which the value of the window-processed square wave 204 is comparatively large is limited to a fixed section immediately after the initialization independently of the frequency, and the power reduction effect of the window-processed square wave 204 is about 6 dB/oct against the frequency when the frequency becomes ½ and one period (time) becomes twice.

In the present embodiment 2, when the fundamental frequency of the input audio signal 101 is 100 Hz and N=1, the amplitude-corrected square wave 110 of 50 Hz is generated. Likewise, when the fundamental frequency of the input audio signal 101 is 50 Hz and N=1, the amplitude-corrected square wave 110 of 25 Hz is generated.

Since a signal of 50 Hz is in a frequency range that an instrument can perform in a bass, it is considered to be a useful signal musically. In contrast, a signal of 25 Hz is a frequency lower than a low-range reproducible limit of an ordinary speaker, and when reproducing the signal of 25 Hz with such a speaker at large power, distortion can occur and the signal can become a harmful signal musically.

However, even when the fundamental frequency of the input audio signal 101 is very low, since the present embodiment 2 can curb a power increase of a super low-range component lower than the low-range reproducible limit of the speaker because of the window function output value 203 and the window processing of the second multiplier 202, it can realize a rich low-range emphasis effect without a distortion feeling.

Figure 5:
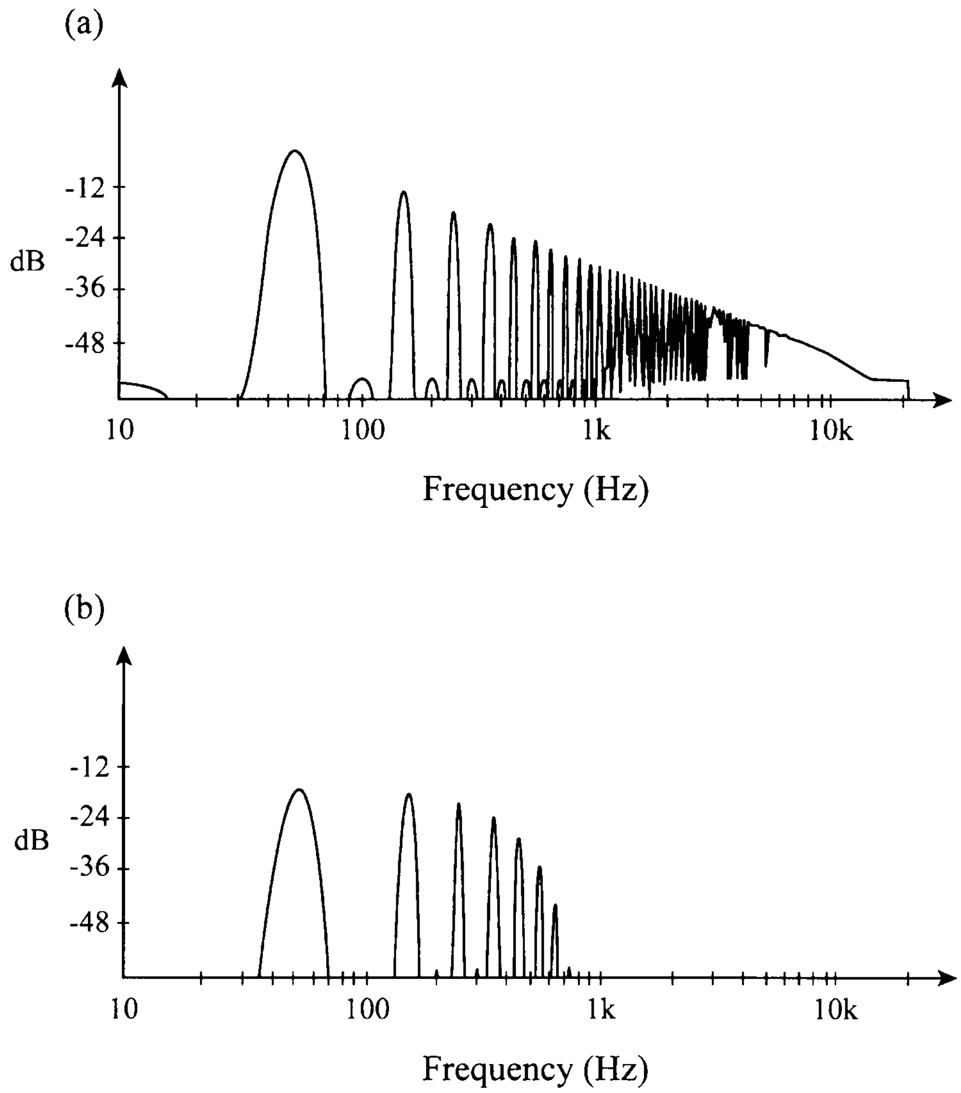
FIG. 5 is a graph showing an example of window processing by the audio signal processing device of the embodiment 2.
Figure 6:
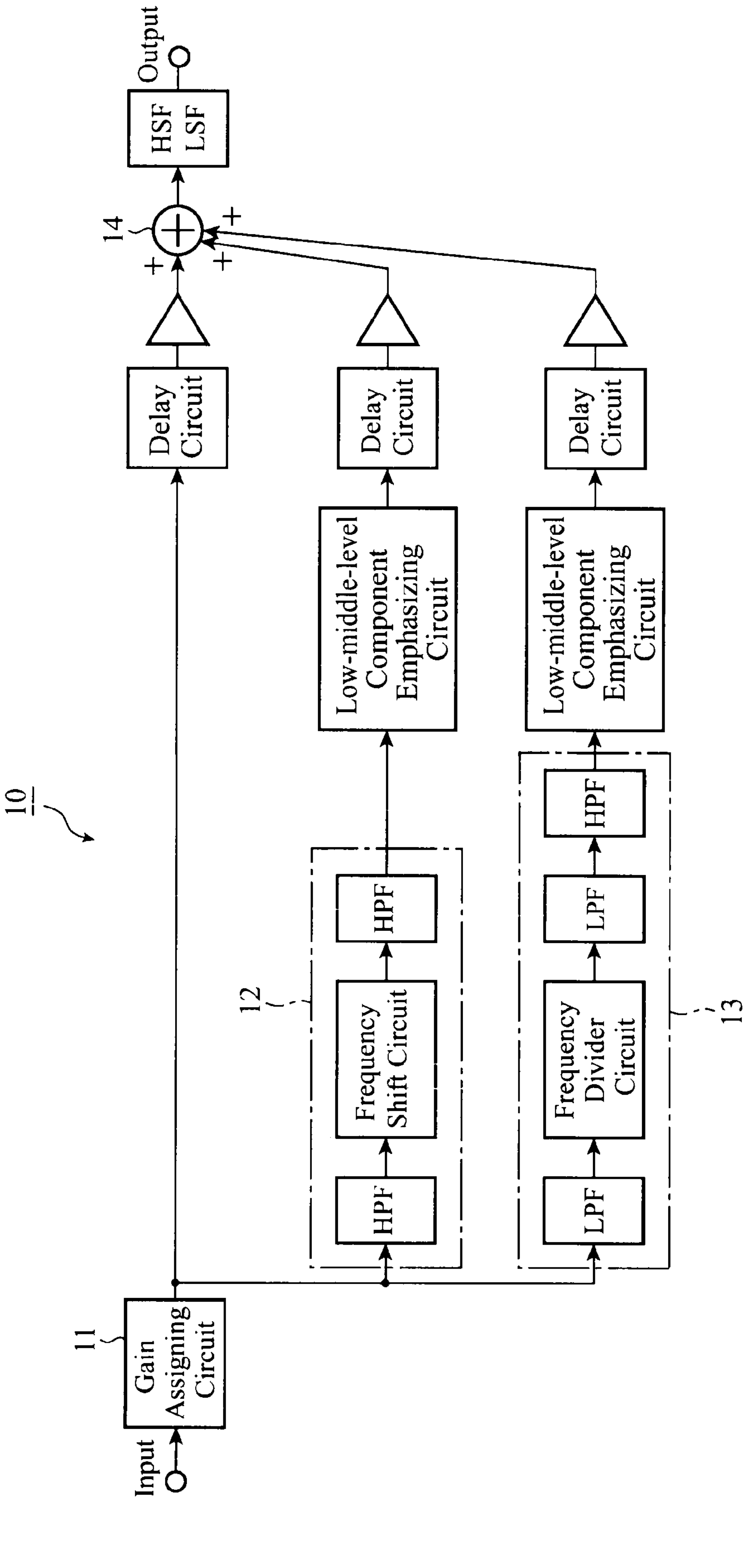
FIG. 6 is a block diagram showing a configuration of an effector of the Patent Document 1.

Furthermore, when using the window function of Condition 1, the present embodiment 2 can prevent discontinuity from occurring in the window-processed square wave 204, thereby being able to curb the generation of spurious harmonics. FIG. 5 is a graph showing an example of the window processing: FIG. 5(*a*) shows frequency characteristics of the square wave 107; and FIG. 5(*b*) shows frequency characteristics of the window-processed square wave 204 after the window processing when using the window function of Condition 1. Incidentally, the example shown in FIG. 5 uses the window function equivalent to that of FIG. 4(*a*) as the window function of Condition 1. It is seen from the frequency characteristics shown in FIG. 5(*a*) that the square wave 107 has harmonics occurring up to a high range beyond 20 kHz. In contrast, it can be confirmed from the frequency characteristics shown in FIG. 5(*b*) that the window-processed square wave 204 has no harmonics beyond about 600 Hz, and hence the window processing suppresses the harmonic components.

The output signal 111, if it includes excessive harmonics, is perceived as uncomfortable crackling sounds at reproduction. The output signal 111 generated by using the window of Condition 1 does not become uncomfortable sounds because the spurious harmonic generation is suppressed.

In addition, when generating a window function, it is necessary to solve complicated triangular functions in general, which causes an increase in the amount of calculation. When using the window function of Condition 2, however, the window function output value 203 (W(t)) can be obtained by only multiplying the preceding output value W (t−1) by the coefficient $\gamma$, thereby being able to reduce the amount of calculation. Furthermore, when actualizing the window function output unit 201 by an analog circuit, it can be realized by a simple configuration such as preparing a capacitor and causing discharge thereof at the same time with the synchronization signal 105 synchronized with the fundamental period of the input audio signal 101.

As described above, according to the embodiment 2, the audio signal processing device 100*a* is configured in such a manner as to comprise the window function output unit 201 for outputting the window function output value 203 that is initialized at every N periods of the input audio signal 101 in accordance with the fundamental period the period detecting unit 102 detects, and the second multiplier 202 for multiplying the square wave 107 the square wave generating unit 106 produces by the window function output value 203. Accordingly, it can offer the audio signal processing device 100*a* capable of achieving the rich low-range emphasis effect without a distortion feeling by curbing the power increase of the super low-range component even when the fundamental frequency of the input audio signal 101 is very low.

In addition, according to the embodiment 2, the window function output unit 201 is configured in such a manner as to output, as the window function output value 203, some value in a prescribed finite section from the time of initialization, and to output zero in the section other than the finite section. Accordingly, it can curb the generation of the spurious harmonics.

Furthermore, according to the embodiment 2, the window function output unit 201 is configured in such a manner as to output, as the window function output value 203, the initial value S at the time of initialization, and the value that decreases monotonically after the time of initialization. Accordingly, it can reduce the amount of calculation for generating the window function, and can realize the window function output unit 201 in a simple configuration when actualizing it by an analog circuit.

INDUSTRIAL APPLICABILITY

An audio signal processing device in accordance with the present invention can realize powerful and rich low-range emphasis effect by restoring only the low-range component of the audio signal deteriorated through compression encoding processing. Accordingly, it is suitable for applications to audio signal processing devices and the like for reproducing a compression-encoded audio signal.

What is claimed is:

1. An audio signal processing device comprising:

a period detector that detects a fundamental period of an input audio signal;

a signal generator that receives the detected fundamental period from the period detector and generates a wave signal whose sign is inverted at every N periods of the input audio signal, where the N denotes an integer multiple of the fundamental period detected by the period detector;

an amplitude corrector that corrects intensity of the signal generated by the signal generator in a manner that the intensity is proportional to the intensity of the input audio signal; and an adder that adds the signal corrected by the amplitude corrector to the input audio signal.

2. The audio signal processing device according to claim 1, wherein the wave signal generated by the signal generator is a square wave signal.

3. The audio signal processing device according to claim 1, wherein the amplitude corrector comprises:

an amplitude correction coefficient generator that calculates an amplitude correction coefficient approximately equal and proportional to the intensity of the input audio signal; and a first multiplier that multiplies the signal generated by the signal generator by the amplitude correction coefficient calculated by the amplitude correction coefficient generator.

4. The audio signal processing device according to claim 3, wherein the amplitude correction coefficient generator sets a value proportional to an estimation value of an effective value of the input audio signal as the amplitude correction coefficient.

5. The audio signal processing device according to claim 3, wherein the amplitude correction coefficient generator sets a value proportional to an instantaneous amplitude value of the input audio signal as the amplitude correction coefficient.

6. The audio signal processing device according to claim 1, further comprising:

a window function output unit that outputs, according to the fundamental period detected by the period detector, a value of a window function initialized at every N periods of the input audio signal, where the N denotes integer; and a second multiplier that multiplies the signal generated by the signal generator by the value output by the window function output unit.

7. The audio signal processing device according to claim 6, wherein the window function output unit outputs a finite value throughout a prescribed time section from a time of initialization, and outputs zero after the prescribed time section.

8. The audio signal processing device according to claim 6, wherein the window function output unit outputs an initial value at a time of initialization, and outputs a value that monotonically decreases after the time of the initialization.

9. The audio signal processing device according to claim 2, wherein a period of the square wave signal is twice the detected fundamental period, and the sign of the square wave signal is inverted at every period of the input audio signal.

10. An audio signal processing device comprising:

a period detector that detects a fundamental period of an input audio signal;

a signal generator that generates a wave signal whose sign is inverted at every N periods of the input audio signal, where the N denotes an integer multiple of the fundamental period detected by the period detector;

an amplitude corrector that corrects intensity of the signal generated by the signal generator in a manner that the intensity is proportional to the intensity of the input audio signal; and an adder that adds the signal corrected by the amplitude corrector to the input audio signal.

* * * * *